(12) United States Patent
Rzasa

(10) Patent No.: US 11,517,805 B2
(45) Date of Patent: Dec. 6, 2022

(54) ELECTRONIC HOME PLATE

(71) Applicant: Freestate Optics, Potomac, MD (US)

(72) Inventor: John Robertson Rzasa, University Park, MD (US)

(73) Assignee: FREESTATE OPTICS, Potomac, MD (US)

( * ) Notice: Subject to any disclaimer, the term of this patent is extended or adjusted under 35 U.S.C. 154(b) by 245 days.

(21) Appl. No.: 16/813,993

(22) Filed: Mar. 10, 2020

(65) Prior Publication Data
US 2020/0289908 A1 Sep. 17, 2020

Related U.S. Application Data

(60) Provisional application No. 62/868,952, filed on Jun. 30, 2019, provisional application No. 62/819,570, filed on Mar. 16, 2019.

(51) Int. Cl.
*A63B 71/06* (2006.01)
*A63B 69/00* (2006.01)
(Continued)

(52) U.S. Cl.
CPC ...... *A63B 71/0605* (2013.01); *A63B 24/0021* (2013.01); *A63B 63/00* (2013.01); *A63B 69/0013* (2013.01); *G06T 5/002* (2013.01); *G06T 7/215* (2017.01); *G06T 7/223* (2017.01); *A63B 2024/0028* (2013.01);
(Continued)

(58) Field of Classification Search
CPC . G06T 7/215; G06T 7/223–238; G06T 7/254; G06T 2207/30224; A63B 71/0605; A63B 2024/0034; A63B 69/0013; A63B 2024/0028
See application file for complete search history.

(56) References Cited

U.S. PATENT DOCUMENTS 5,401,016 A * 3/1995 Heglund ............ A63B 69/0002
473/455
6,233,007 B1 * 5/2001 Carlbom ............... G01S 3/7865
348/157
(Continued)

FOREIGN PATENT DOCUMENTS

WO 2001054781 A3 1/2002

OTHER PUBLICATIONS

Theodore MacLeod, Dominic Palermo, and Michael Panicci, "The Detection and Parametric Estimation of Fast-Moving Objects for Smart Home Plate Application," Worcester Polytechnic Institute, published online at https://digital.wpi.edu/pdfviewer/ws859j29t on Apr. 25, 2019 (Year: 2019).*

(Continued)

*Primary Examiner* — Laura Davison
(74) *Attorney, Agent, or Firm* — Potomac Law Group, PLLC

(57) ABSTRACT

An electronic home plate system includes a home plate enclosure and at least one image sensor system disposed within the enclosure, each image sensor system including an image sensor, a lens and a first processor. The first processor is adapted to detect a motion of a ball by continuously capturing frames from the image sensor. The detected motion includes the ball passing over the home plate enclosure or the ball passing near and not over the home plate enclosure.

20 Claims, 12 Drawing Sheets

(51) Int. Cl.
    *A63B 24/00*     (2006.01)
    *A63B 63/00*     (2006.01)
    *G06T 5/00*     (2006.01)
    *G06T 7/223*     (2017.01)
    *G06T 7/215*     (2017.01)

(52) U.S. Cl.
    CPC ....... *A63B 2220/13* (2013.01); *A63B 2220/30* (2013.01); *A63B 2220/805* (2013.01)

(56) References Cited

U.S. PATENT DOCUMENTS

| | | | | |
|---|---|---|---|---|
| 6,304,665 | B1* | 10/2001 | Cavallaro | A63B 24/0021 382/106 |
| 7,292,711 | B2* | 11/2007 | Kiraly | G06T 7/20 348/169 |
| 9,167,228 | B2* | 10/2015 | Monari | H04N 13/20 |
| 9,171,211 | B2* | 10/2015 | Keat | G06T 7/20 |
| 9,352,208 | B2* | 5/2016 | Davis | A63B 71/0605 |
| 9,846,805 | B2* | 12/2017 | Painter | G06K 9/00348 |
| 10,188,931 | B2* | 1/2019 | Larson | A63B 69/0013 |
| 10,369,445 | B2* | 8/2019 | Stemle | G06T 7/20 |
| 11,138,744 | B2* | 10/2021 | Hall | G06T 7/254 |
| 2005/0179774 | A1* | 8/2005 | Fletcher | A63B 69/0013 348/61 |
| 2007/0133682 | A1* | 6/2007 | Arai | H04N 19/57 375/240.16 |
| 2009/0062002 | A1* | 3/2009 | Kotlarik | G07F 17/3297 463/33 |
| 2013/0172130 | A1 | 7/2013 | Johnson | |
| 2014/0206480 | A1 | 7/2014 | Davis et al. | |
| 2016/0279496 | A1 | 9/2016 | Lee et al. | |
| 2016/0350922 | A1* | 12/2016 | Tofolo | G06T 7/97 |
| 2017/0100658 | A1 | 4/2017 | Tally | |
| 2017/0256066 | A1 | 9/2017 | Richard et al. | |
| 2017/0333777 | A1 | 11/2017 | Spivak et al. | |
| 2017/0336509 | A1 | 11/2017 | Davis et al. | |
| 2018/0207508 | A1 | 7/2018 | Lee et al. | |

OTHER PUBLICATIONS

Yosuke Yamaguchi and Motoki Miura, "Real-time Analysis of Baseball Pitching using Image Processing on Smartphone", 20th International Conference on Knowledge Based and Intelligent Information and Engineering Systems, Procedia Computer Science 96 (2016), 1059-1066 (Year: 2016).*

Worcester Polytechnic Institute, "Project Presentation Day" Program, p. 13, describing presentation of "The Detection and Parametric Estimation of Fast-moving Objects for Smart Home Plate Application" by MacLeod et al. on Apr. 19, 2019, www.wpi.edu/sites/default/files/2019/04/18/Provost_Proje (Year: 2019).*

International Search Report issued in the corresponding International Application No. PCT/US2020/022655, dated Jul. 6, 2020.

Written Opinion of the International Search Report issued in the corresponding International Application No. PCT/US2020/022655, dated Jul. 6, 2020.

* cited by examiner

ELECTRONIC HOME PLATE

CROSS REFERENCE TO RELATED APPLICATIONS

This application claims priority of U.S. Provisional Patent Application Ser. No. 62/819,570, filed on Mar. 16, 2019, and claims priority of U.S. Provisional Patent Application Ser. No. 62/868,952, filed on Jun. 30, 2019. The disclosure of each of these applications is hereby incorporated by reference.

FIELD

One embodiment is directed generally to a baseball/softball home plate, and in particular to an electronic home plate that automatically determines balls/strikes and other analytics.

BACKGROUND INFORMATION

In baseball and softball, the strike zone is a conceptual right pentagonal prism over the home plate which defines the boundaries through which a pitch must pass in order to be counted as a "strike" when a batter does not swing the bat.

FIG. 1 illustrates the typical strike zone. As shown in FIG. 1, the top 10 of the strike zone 12 is defined in the official rules of baseball as a horizontal line at the midpoint between the top of the batter's shoulders and the top of the uniform pants. The bottom 14 of the strike zone 12 is a line at the hollow beneath the kneecap of the batter. The right and left boundaries 16, 18 of the strike zone 12 correspond to the edges 20, 22, of the home plate 24. A pitch that touches the outer boundary of the strike zone is as much a strike as a pitch that is thrown right down the center of the strike zone. A pitch at which the batter does not swing and which does not pass through the strike zone is called a ball.

The home plate, formally designated as the home base in the rules, is a final base that the player must touch to score. The home plate is a five-sided slab of whitened rubber that is set at ground level. The batter stands in the batter's box when ready to receive a pitch from a pitcher.

In baseball, an umpire is a person charged with officiating the game, including beginning and ending the game, enforcing the rules of the game and the grounds, making judgment calls on plays, and handling disciplinary actions. In a game officiated by two or more umpires, the umpiring chief (home-plate umpire) is the umpire who is in charge of the entire game. This umpire calls balls and strikes, calls fair balls and foul balls, short of first/third base, and makes most calls concerning the batter or concerning the base runner near home plate. The umpire 26 usually positioned behind the catcher's box and declares whether the pitch is a strike or a ball.

It is clear that human error may be present in judging whether a pitch passes through the strike zone or outside the boundaries. This is especially true in the case of little league and scholastic league baseball games where the umpires are typically non-professional and/or volunteers. The probability of human errors in these situations is increased.

SUMMARY

Embodiments are directed to an electronic home plate system that includes a home plate enclosure and at least one image sensor system disposed within the enclosure, each image sensor system including an image sensor, a lens and a first processor. The first processor is adapted to detect a motion of a ball by continuously capturing frames from the image sensor. The detected motion includes the ball passing over the home plate enclosure or the ball passing near and not over the home plate enclosure.

BRIEF DESCRIPTION OF THE DRAWINGS

Further embodiments, details, advantages, and modifications will become apparent from the following detailed description of the embodiments, which is to be taken in conjunction with the accompanying drawings.

DETAILED DESCRIPTION

One embodiment is an electronic home plate that acquires images of a moving ball at a high frame rate by a processor/integrated circuit (e.g., a field-programmable gate array ("FPGA")). The processor includes a self-triggering mechanism that continuously captures frames, looks for motion of a desired type between successive frames, and then sends a motion image back to a host or secondary device for more complex offline image processing.

Because embodiments are based on an architecture at a low level in the processor, basic motion can be detected at the frame-rate of the image sensor, without the need for slowing down acquisition time at high speeds. Therefore, embodiments can detect an object (e.g., baseball or softball) in flight at high speeds when the image sensor has no prior knowledge that the object is coming into the field of view. The captured imagery can then be used to calculate 3D position, velocity, acceleration characteristics of the object, as well as other data pertinent to the application (e.g., spin, launch angle, bat speed, etc. for a baseball application).

Embodiments use one or more synchronized cameras. More than one camera can be used to increase the field of view. In other embodiments, additional cameras may be oriented in other directions to gather more information in sync with the other cameras. For example using four cameras in baseball or softball would enable the catcher's glove position, batter stance and pitcher stance to be acquired, essentially creating a fully instrumented home plate that can be used in game play or training and without any changes being required in the field or player behavior.

Embodiments, in general, can solve one of the biggest issues in baseball and softball, which is maintaining an accurate count of how many pitches a player actually throws, since this is a very important metric in maintaining a player's health. Embodiments that are utilized in games, bullpens, training facilities, and backyards, can measure all pitches thrown (even if well outside the plate), tagged to the player's name, and then saved in the cloud to accurately keep track of how many pitches they've truly thrown in a game, day, week, etc.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
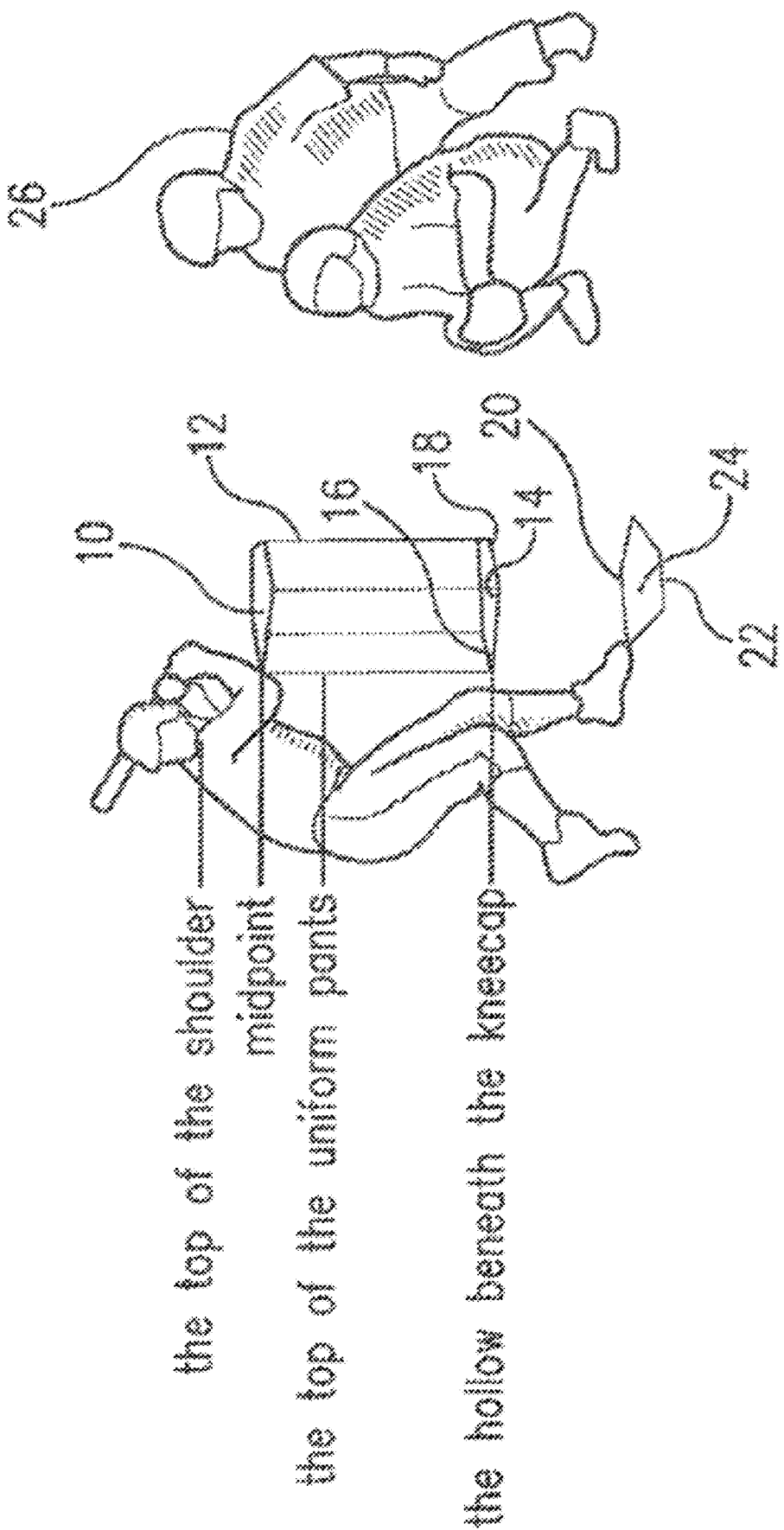
FIG. 1 illustrates the typical strike zone.
Figure 2:
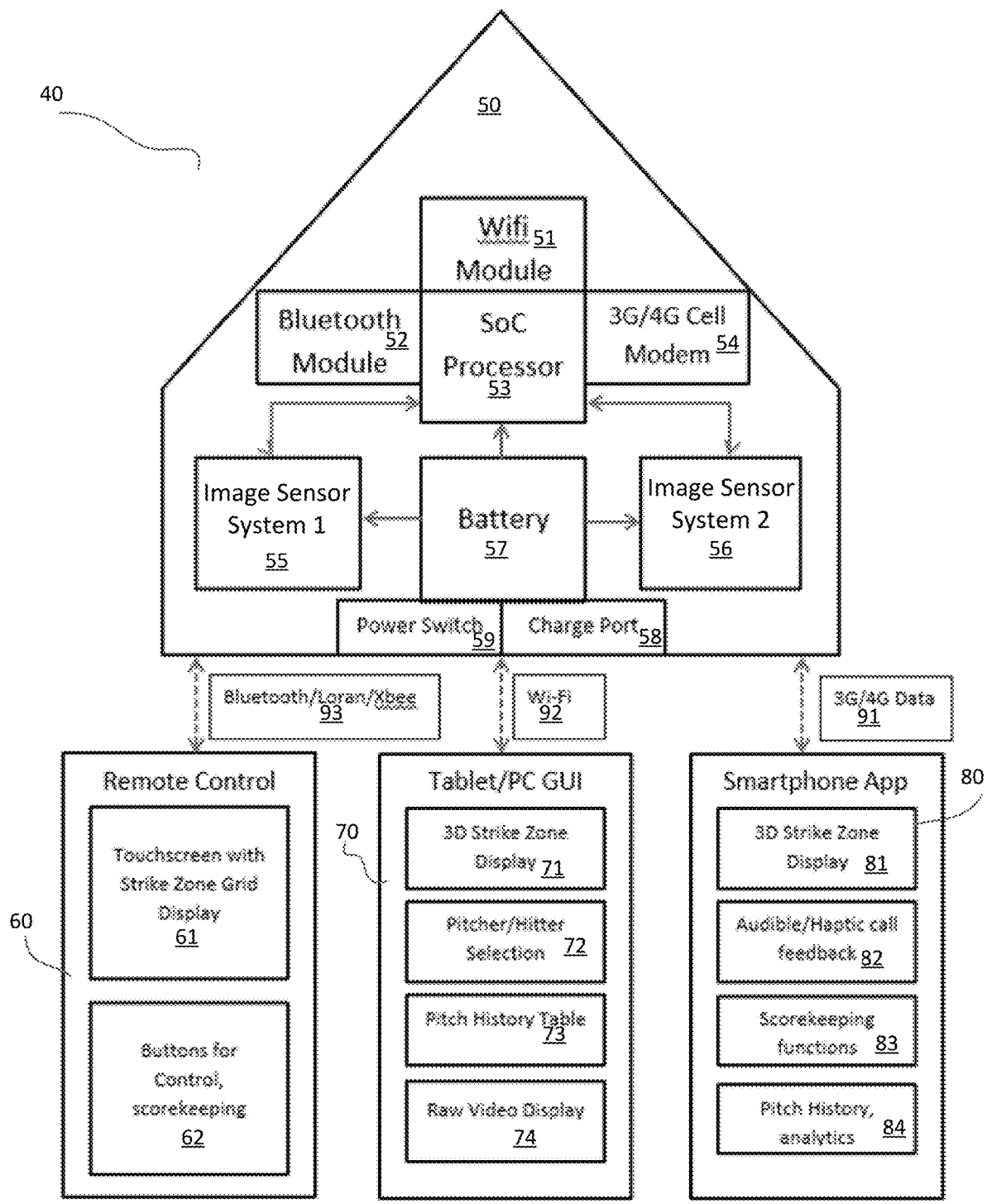
FIG. 2 is an overall block diagram of an electronic home plate system in accordance to embodiments of the invention.

FIG. 2 is an overall block diagram of an electronic home plate system 40 in accordance to embodiments of the invention. System 40 functions as a ball or projectile detection system (also referred to as an electronic home plate system or EHP system) which is a low-cost and effective home plate for baseball and softball games, containing electronic and opto-electronic components adapted for detection and indication of the presence, position, and speed of a baseball passing over home plate.

System 40 is designed to assist umpires in determining if a pitch is a "ball" or a "strike", and may be used in baseball training exercises. Although system 40 is envisioned for use in baseball games of both professional and non-professional categories, embodiments may be primarily targeted to Little League and scholastic league markets where the umpires are typically non-professional and volunteers.

System 40 also has great value as a training aid for pitchers. System 40 facilitates obtaining an XY map of positions and speeds of pitches. Specifically, a pitcher can deliver a number of pitches over the electronic home plate and obtain the XY map of where all pitches went, along with the speed of each one. Embodiments can also capture information in the Z axis (e.g., in front, over, and behind plate) in order to calculate the speed of the ball and to calculate the location over the plate a hitter made contact with the ball, as well as using these calculated values to calculate the 3D trajectory of the ball over the plate.

System 40 includes an electronic home plate 50, and one or more remote, secondary devices in wireless communication with EHP 50, including a remote control or fob 60, a tablet/personal computer with graphical user interface 70 or a smartphone application ("app") 80.

EHP 50 includes a system on a chip ("SOC") processor or general purpose microprocessor 53 that can execute image processing algorithms, and may include storage devices (e.g., transitory or non-transitory computer readable media) for storing instructions to be executed by processor 53 in a software embodiment. EHP 50 further includes communication elements for providing wireless communication between EHP 50 and to either or all of remote control 60, a tablet/personal computer 70 or smartphone 80. The communication can be Bluetooth 52, via Bluetooth channel 93, Wi-Fi 51 via Wi-Fi channel 92 or cellular 54 via cellular channel 91. Any of the disclosed data communications/transmission methods can be used for any of elements 60, 70 and 80, and any other known wireless data transmission method can be used in other embodiments.

EHP 50 further includes a rechargeable battery 57, and two or more "image sensor systems" or "cameras" 55, 56. EHP 50 further includes a charge port 58, for connecting power to charge battery 57 either wired or wirelessly (e.g., using inductive charging), and a power switch 59.

Remote control 60 includes a touchscreen 61 with a strike zone grid display 61, and buttons 62 or other user interfaces for inputting data. GUI 70 includes a 3D strike zone display 71 for displaying the strike zone and the detection of the ball within the strike zone, a pitcher/hitter selection 72, a pitch history table 73, and a raw video display 74.

App 80 includes a 3D strike zone display 81, an audible/haptic call feedback 82, scorekeeping functions 83, and pitch history analytics 84.

As disclosed, embodiments use one or more cameras or image sensors, where the images must be captured and processed at a continuous high speed without skipping any frames since the camera(s) are not aware of if/when the object (e.g., the ball) will appear in its field of view. However, embodiments cannot substantially be allowed to slow down the frame-rate during processing because that would risk missing the object entirely.

Figure 3:
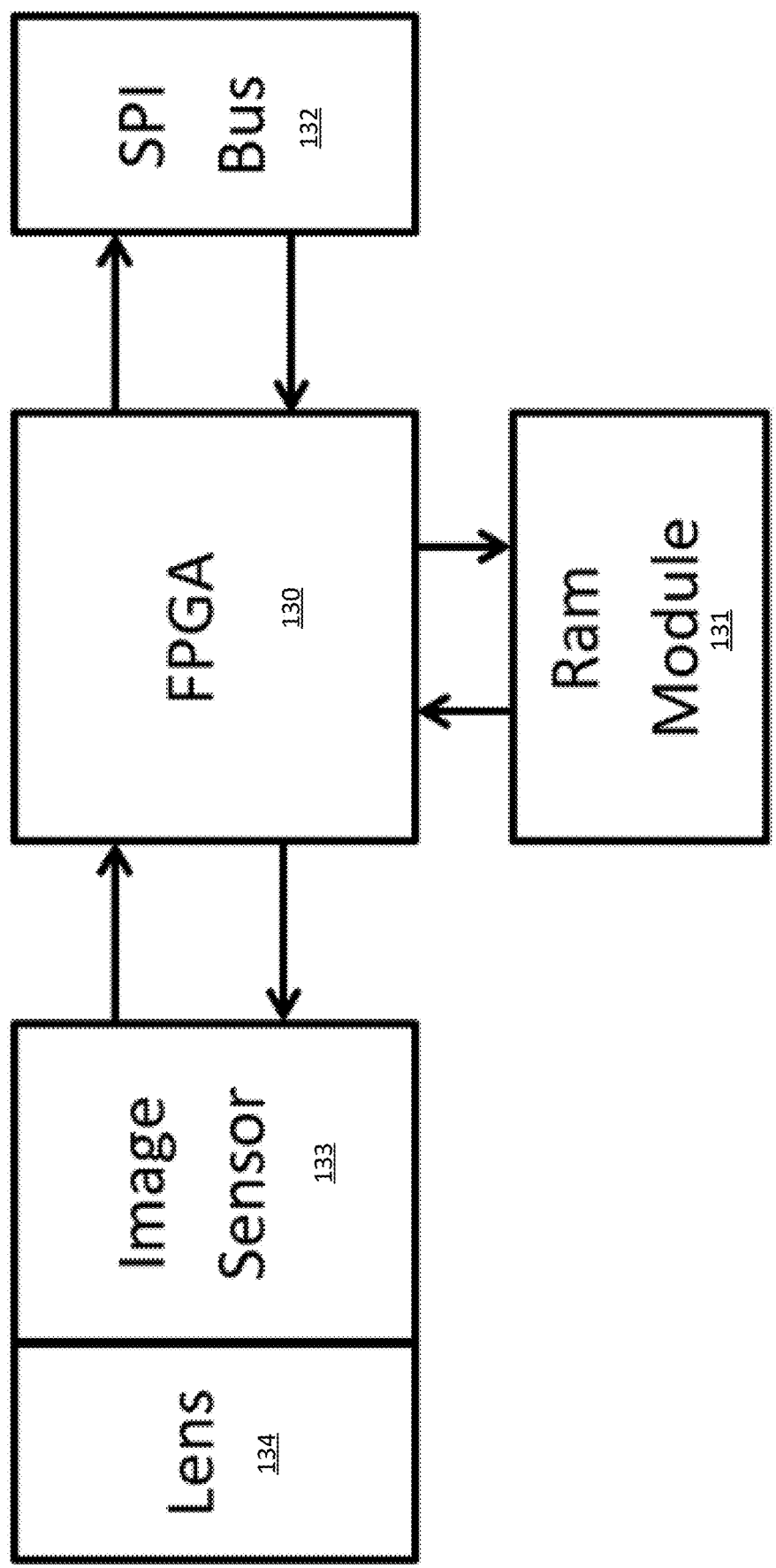
FIG. 3 is a block diagram of the primary components of each of the image sensor/cameras of the electronic home plate system in accordance to embodiments.

FIG. 3 is a block diagram of the primary components of each of the image sensor/cameras (collectively, "image sensor system") such as image sensor systems 55 and 56 of FIG. 2) of EHP system 40 in accordance to embodiments. The four primary components include a high speed global shutter image sensor 133 (with a corresponding lens 134), an FPGA 130, a high speed RAM bank 131 and a Serial Peripheral Interface ("SPI") bus 132 (or any type of interface to a wireless device (e.g., smartphone 80, tablet/PC 70). The components of FIG. 3 are part of home plate 50 of FIG. 2.

Figure 4:
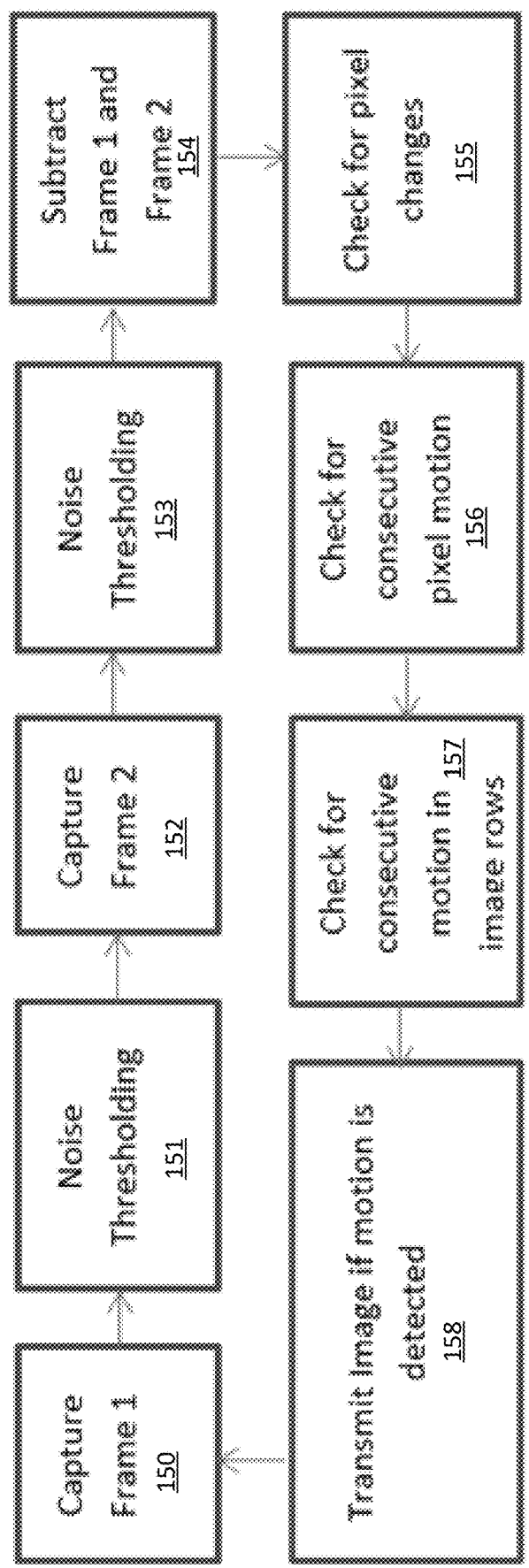
FIG. 4 is a flow diagram of the functionality of object detection performed by each image sensor system of FIG. 3 in accordance to one embodiment.

FIG. 4 is a flow diagram of the functionality of object detection performed by each image sensor system of FIG. 3 in accordance to one embodiment. In one embodiment, the functionality of the flow diagram of FIG. 4 (and FIGS. 5 and 11 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

The functionality of FIG. 4 is a continuous loop in which the image sensor(s) 133 continuously acquires images (at 150 and 152), adjusting itself for noise thresholding purposes such as exposure and analog/digital gain (at 151 and 153), and then sends this data to FPGA 130. During the time between frames, FPGA 130 subtracts the last two frames (at 154) and performs signal processing to determine whether motion of a particular type occurred (i.e., a ball has passed over or nearby plate 50). In embodiments, Frame 1 and Frame 2 are consecutive frames, so that every frame is processed by the functionality of FIG. 4.

The signal processing in embodiments includes checking for pixel changes at 155, checking for consecutive pixel motion in one row at 156, and checking for consecutive motion in image rows at 157. Optionally, a check if motion limits have been exceeded can be done after 157. Because of noise in the environment and image sensor 133, some motion will always appear. The signal processing allows for FPGA 130 to greatly reduce the number of events that are perceived as motion of interest, and then report these transient events to another, more powerful processor (e.g., smartphone 80, tablet/PC 70, etc.) for additional processing at 158. In one embodiment where the electronic components are embedded in home plate 50, Wi-Fi module 51 is used to transmit information to keep the system fully portable, but not lead to long wait times. In other embodiments, other transmission methods can be used.

The following pseudocode implements the functionality of 151-155 of FIG. 4 in embodiments:

For embodiments that include motion limits after 157, the motion limits are implemented to improve reliability and reduce false events. Specifically, balls and bats moving over the plate will generate a total number of motion pixels in a fairly consistent range, so anything more than this is most likely an errant event to be ignored. In some embodiments, the motion limit is split into two areas, one part covering the front section of the plate, the other part covering the back section. Each area has a different motion limit to account for two cases: 1) the batter is way ahead of the ball and 2) the ball and bat appear at about the same time in the front part of the image. Because the overall goal of the system is to measure ball behavior (with or without the bat present), and the ball and bat are coming from opposite directions, the back part has a lower motion limit to prevent early triggers from the bat (the bat's apparent size is larger than a ball), and

```
Frame1=acquire_image( );
Frame2=acquire_image( );
for (int i=0;i<vertical_resolution;i++)
{
    for (int j=0;j< horizontal_resolution;j++)
    {
        If (Frame1.pixel(horizontal_resolution, vertical_resolution)>noise_threshold)
        {
            Frame1_motion_image(horizontal_resolution, vertical_resolution)=1;
        }
        else
        {
            Frame1_motion_image(horizontal_resolution, vertical_resolution)=0;
        }
    }
}
for (int i=0;i<vertical_resolution;i++)
{
    for (int j=0;j< horizontal_resolution;j++)
    {
        If (Frame2.pixel(horizontal_resolution, vertical_resolution)>noise_threshold)
        {
            Frame2_motion_image(horizontal_resolution, vertical_resolution)=1;
        }
        else
        {
            Frame2_motion_image(horizontal_resolution, vertical_resolution)=0;
        }
    }
}
for (int i=0;i<vertical_resolution;i++)
{
    for (int j=0;j< horizontal_resolution;j++)
    {
        Motion_image(horizontal_resolution, vertical_resolution=abs(Frame2_motion_image-Frame1_motion_image);
    }
}
```

The following pseudocode implements the functionality of 156-157 of FIG. 4 in embodiments:

the front's motion limit is higher to allow for triggering if the ball and bat appear at about the same time.

```
for (int i=0;i<vertical_resolution;i++)
{
    for (int j=0;j< horizontal_resolution;j++)
    {
    If (all pixels in Motion_image.subset(row_count: row_count+motion_threshold, pixel_count
:pixel_count+motion_threshold)==1)
    {
    motion_detected=1;
    send_images_to_SoC( );
    break;
    }
    }
}
```

Further, some embodiments include configurable regions of interest in X and Y where sections of the image can be completely excluded from the triggering calculations. The primary reason for this is to mask out the area where the body of the hitter can sometimes appear. This reduces false triggers caused by the hitter moving their body about before and during a swing.

Although the embodiment of FIG. 2 includes two image sensor systems 55, 56, in other embodiments as little as one image sensor system can be used, or more than two image sensor systems can be used.

Figure 5:
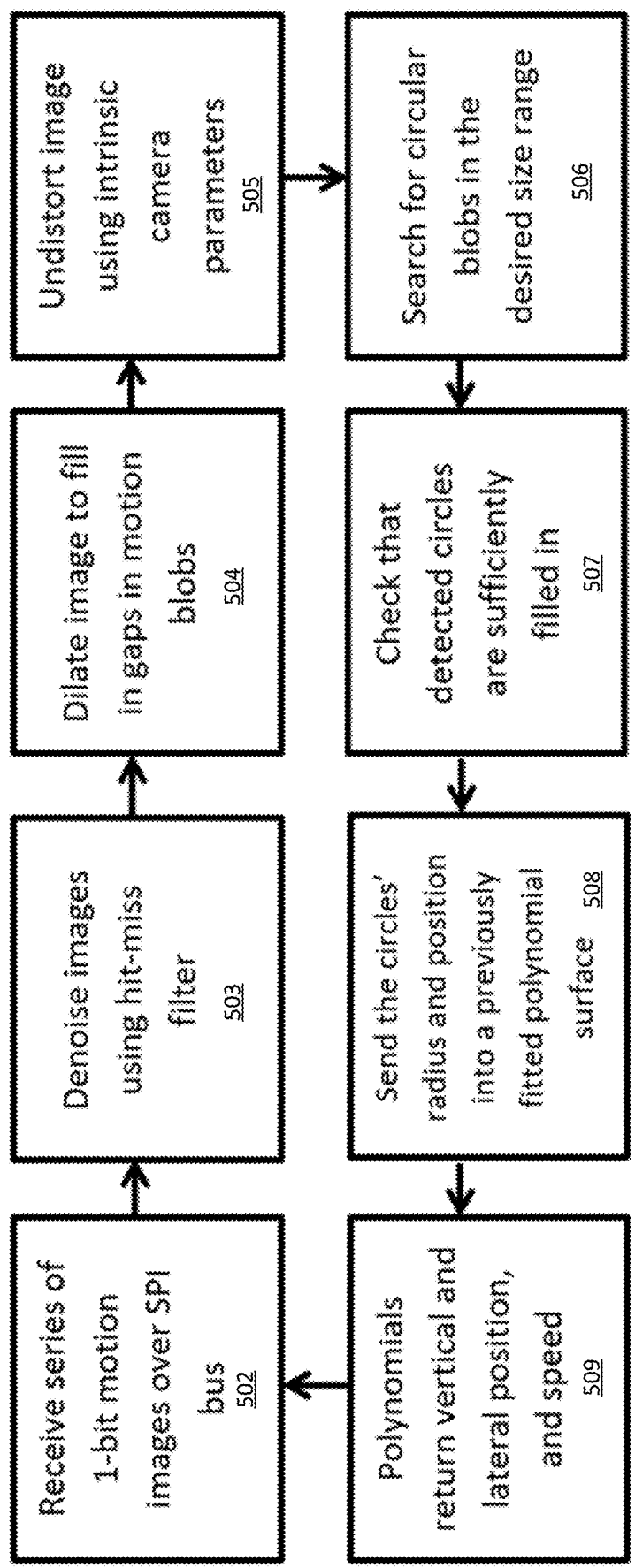
FIG. 5 is a flow diagram of characteristic measurement functionality after an object has been detected in accordance to embodiments.

FIG. 5 is a flow diagram of characteristic measurement functionality after an object has been detected in accordance to embodiments. The functionality of FIG. 5 is performed by processor 53 in one embodiment. In other embodiments, "secondary" processor (e.g., the processor of smartphone 80 or tablet/PC 70, etc.) implements the functionality, or home plate 50 includes a second, more powerful processor for the functionality.

At 502, the processor receives a 1-bit motion image over the SPI bus 132, in which a pixel is white if it changed between two successive images, black otherwise. At 503, the motion image is denoised using a hit-miss filter. The hit-or-miss filter is applied to remove noise pixels where one motion pixel is surrounded by all black. This is usually from sensor noise or subtle changes in solar irradiance.

At 504, the image is dilated to fill in gaps in motion blobs. In the dilation, places where small clusters of black pixels surrounded by large areas of white ones are filled in with white. This can occur again from sensor noise, or when the pixel value of the moving object is very close to the background pixel value in the previous image.

At 505, intrinsic camera parameters are used to undistort the image. The image is undistorted using a standard algorithm for pinhole cameras. Because wide angle lenses can bend the images such that straight lines appear curved, this step flattens the image such that an object at the same distance from the camera has the same apparent size in the middle of the image and at the extremities At 506, circular blobs in a desired size range are searched for. A standard blob detection algorithm is used to find clusters of motion pixels that meet certain criteria: total size, curvature of the outer contour, and ellipticity. This helps distinguish circular balls from other things such as bats, people, birds, etc.

At 507, it is checked if detected circles are sufficiently filled in. This check ensures that the blob is filled enough to truly be a ball in motion, so the total number of motion pixels in the bounding box around the blob is about on par for a circular object. For a bounding box of size "a" on a side, the area of the inscribed circle is $pi*(a/2)^2$, so the ratio is $(pi*(a/2)\hat{2})/(a\hat{2})$, or 0.785.

At 508, the circles' radius and position are sent into a previously fitted polynomial surface. At 509, the polynomials return the vertical and lateral position and the speed. For 508, 509, the pixel location and radius of each circular blob is fed into a polynomial formula that returns object height, lateral position off center, and speed. The calibration process gives a fully defined and unambiguous position for a ball of a known size anywhere in the calibration region. The functionality then continues at 502.

The following pseudocode implements the functionality of 506-509 of FIG. 5 in embodiments:

```
[circular_blob_locations, circular_blob_radii]=blob_detect(undistortedimage, circle_parameters);
For (int l;i<size(circular_blob_locations);i++)
{
    If (calculate_fill_factor(circular_blob_locations[i], , circular_blob_radii[i])>fill_factor) // a filled circle inside
a bounding square of side length a has a fill factor of pi*(a/2)² / a², or 0.785 for reference
    {
        Valid_circle_location[j]= circular_blob_locations[i];
        Valid_circle_ radii [j]= circular_blob_ radii [i];
        J++;
    }
}
For (int i=0;i<j);i++)
{
    Vertical_position[i]=vertical_polynomial_fit( Valid_circle_ radii[i]);
    lateral_position[i]=lateral_polynomial_fit ( Vertical_position[i],Valid_circle_location[i]);
    speed[i]=speed_polynomial_fit (Valid_circle_location[i] ,Valid_circle_location[i−1]); //look at spacing
between consecutive circles to find speed
}
```

Figure 6:
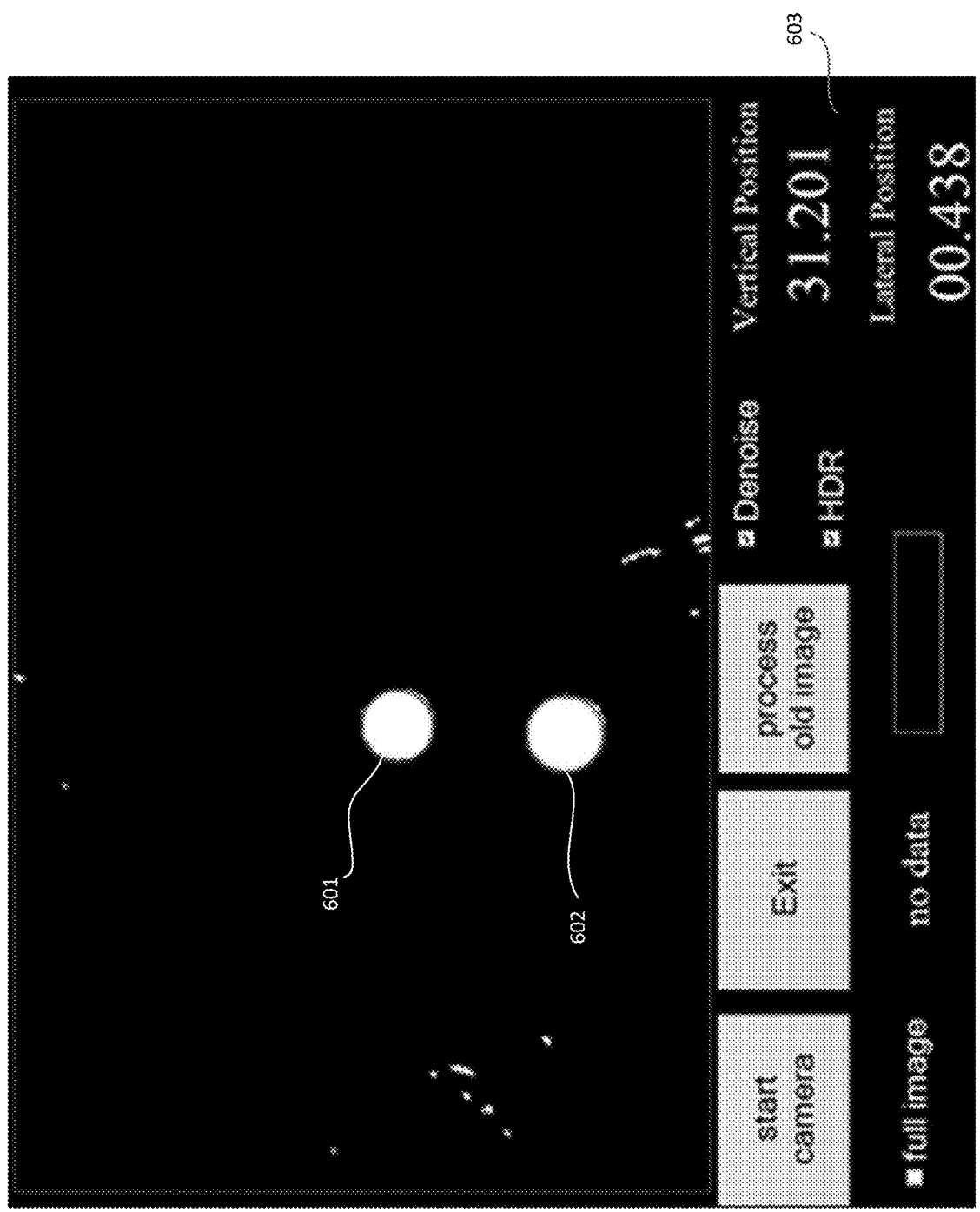
FIG. 6 is a user interface showing a sample motion detection image generated by the functionality of FIG. 5 in accordance to embodiments.

FIG. 6 is a user interface showing a sample motion detection image generated by the functionality of FIG. 5 in accordance to embodiments. The embodiments shown in FIG. 5 uses two image sensor systems. The image processing functionality of FIG. 5 has marked the two motion images 601, 602 in red and then calculated their vertical and lateral position at 603. The radius of each circle along with its x-position in the picture are used to determine pitch location. The x-distance y-distance is used along with the camera's exposure time to calculate velocity. The ball's downwards trajectory is found by the change in radius along with speed.

The user interface of FIG. 6 in embodiments is generated both by the functionality of FIG. 4, which generates the raw motion image, and the functionality of FIG. 5 which locates the balls in raw image and displays the red overlay marking their positions.

Figure 7:
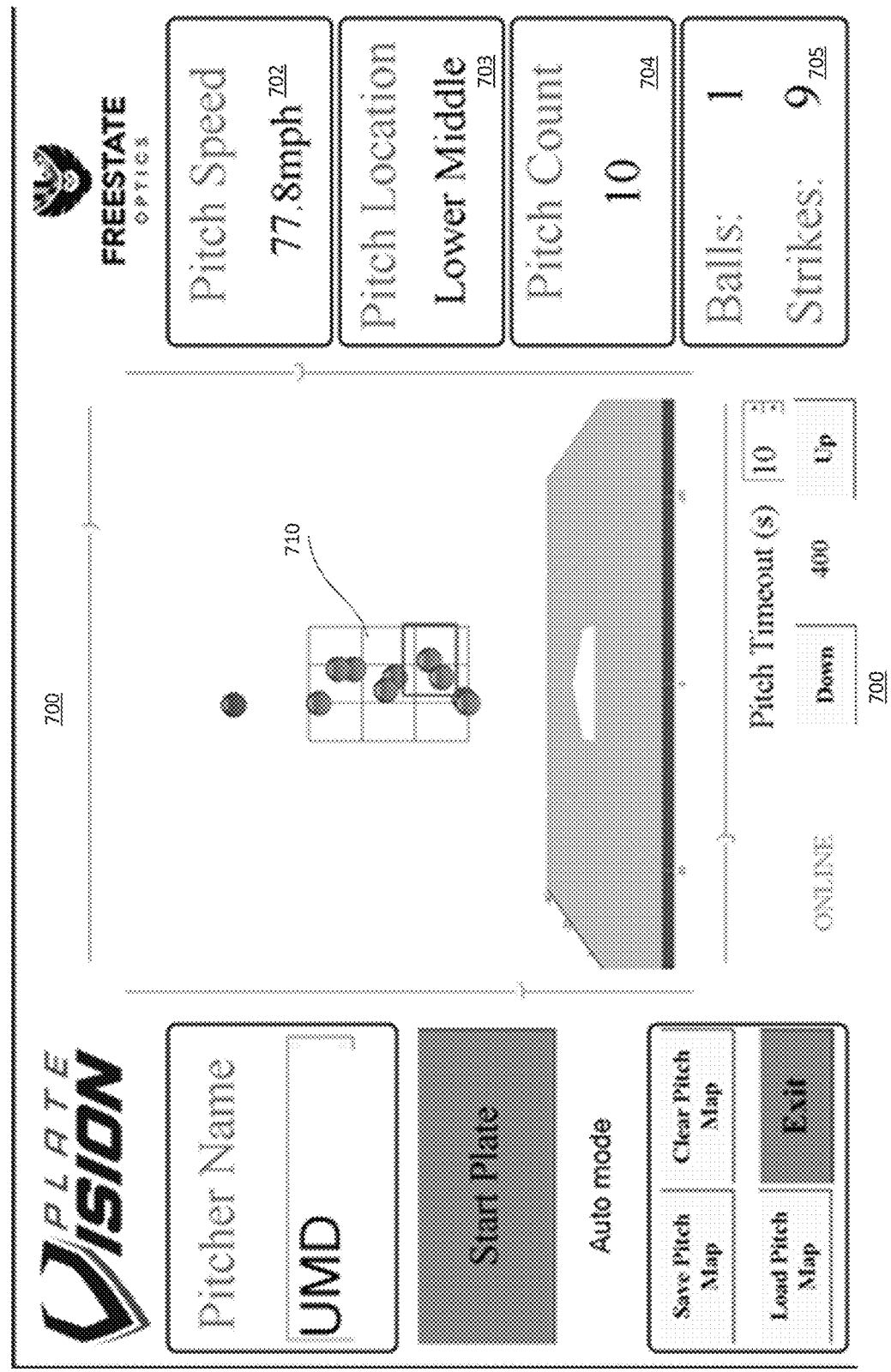
FIG. 7 is an example graphical user interface that is output in embodiments of the invention.

FIG. 7 is an example graphical user interface ("GUI") 700 that is output in embodiments of the invention. GUI 700 in embodiments would be displayed on one of the secondary devices in wireless communication with home plate 50, such as tablet 70 and smartphone 80. Information provided on GUI 700 includes the pitch speed 702, the pitch location 703, the pitch count 704, and the number of balls/strikes 705 for a session, as well as an XY grid 710 showing ball placement for the session.

Figure 8A:
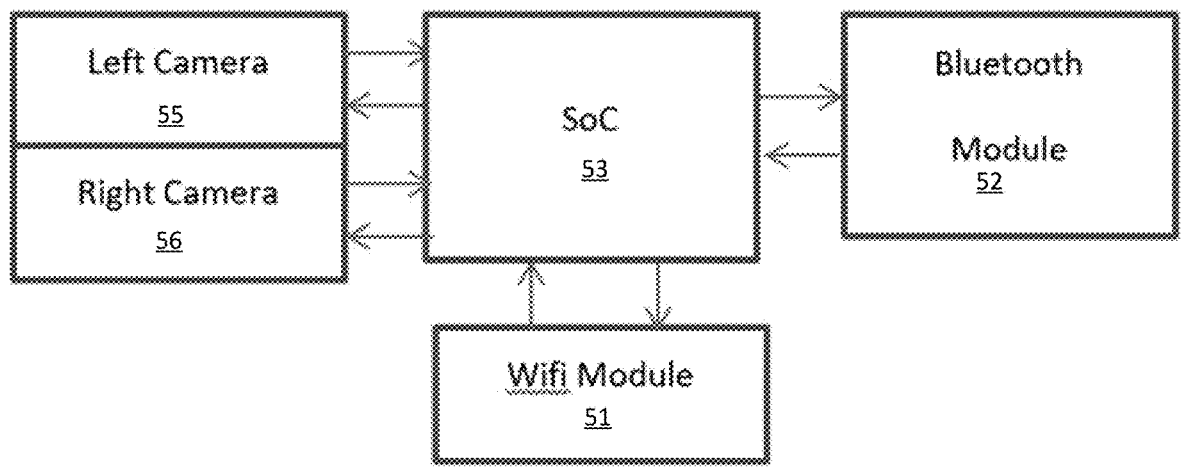
FIG. 8A is a block diagram of the primary components of the electronic home plate system in accordance to embodiments.

FIG. 8A is a block diagram of the primary components of EHP system 40 in accordance to embodiments. The embodiment of FIG. 8A includes two image sensor systems, similar to the embodiment of system 40 shown in FIG. 2.

In embodiments, SoC 53, which controls image sensor systems 55, 56, has its own set of code to process the images, apply a calibration, and send the results out, while also accepting input from remote controller 60. SoC 53 sends an arm command to the corresponding camera with various parameters and then waits for a reply. If the camera sends a "no trigger" signal, that means nothing was detected in the predetermined time period. Otherwise it sends a series of 1-bit motion images.

The arm command is for adjusting triggering parameters, such as exposure time, gain, motion thresholds, detection regions, etc. The timeout provides a way for the cameras to cycle and look for new arm data. The raw image retrieval is a side effect of the motion image generation and can be used for additional training analytics.

Figure 9:
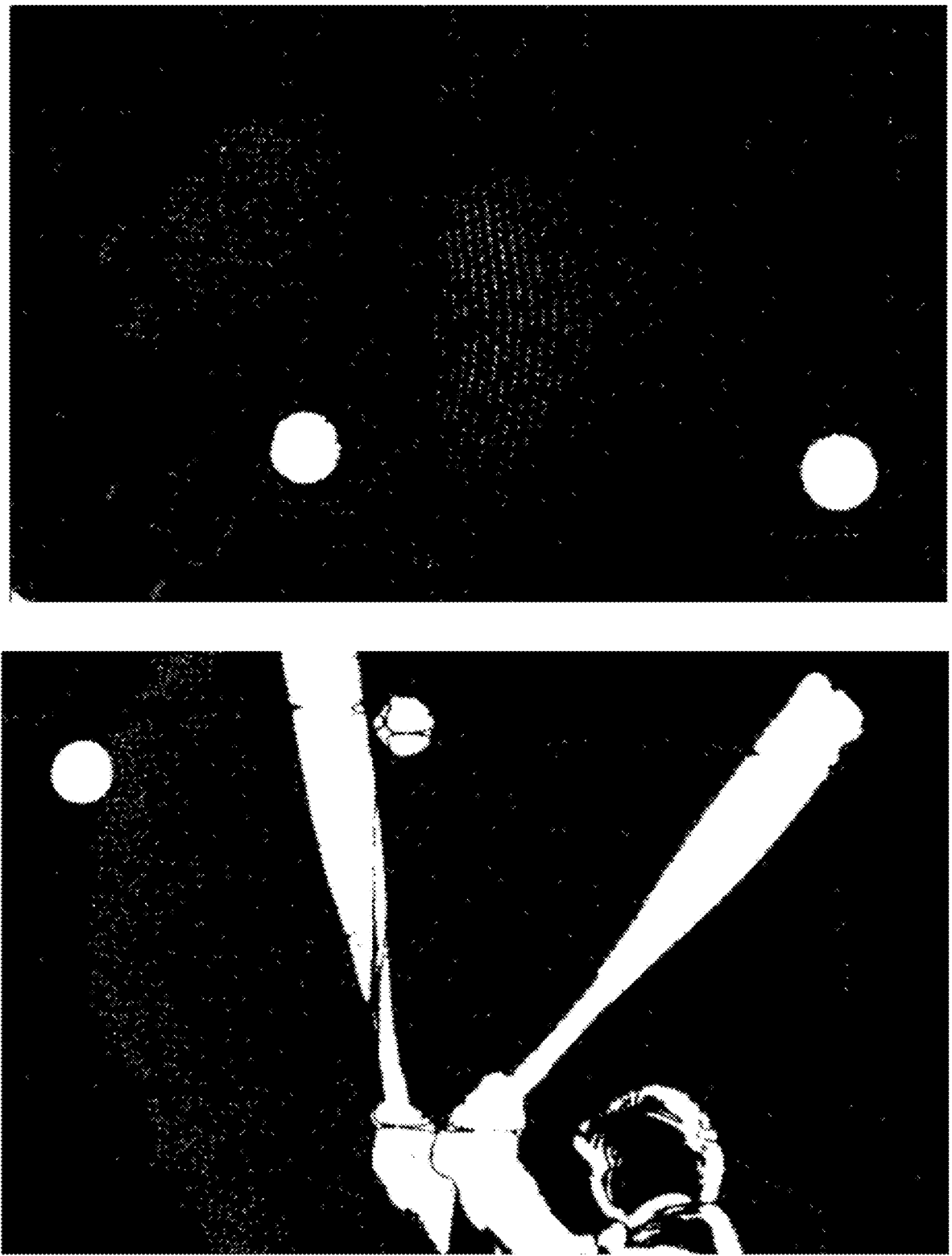
FIG. 9 illustrates example 1-bit motion images in accordance to embodiments.
Figure 10:
FIG. 10 illustrates an example 8-bit image in accordance to embodiments.

FIG. 9 illustrates example 1-bit motion images in accordance to embodiments. In embodiments, SoC 53 also has the option of retrieving raw 8-bit images. FIG. 10 illustrates an example 8-bit image in accordance to embodiments.

SoC 53 then completes basic circular blob detection using standard image processing libraries, which outputs the XY location and radius of blobs that meet certain criteria. This information is then fed into a set of equations that apply a calibration to find the pitch location. The height above the plate is related to the radius of the ball, but nonlinearly. The lateral position is related to the height and centroid pixel location of the ball in the image. The calibration is created by taking pictures of baseballs in positions in a 4" XYZ grid above the plate that encompasses the field of view of both cameras. This produces an unambiguous map of ball location over the plate. Embodiments can perform this this calibration as a one-time factory procedure. In contrast, other known systems must be calibrated after installation, and then again any time they are moved.

Figure 8B:
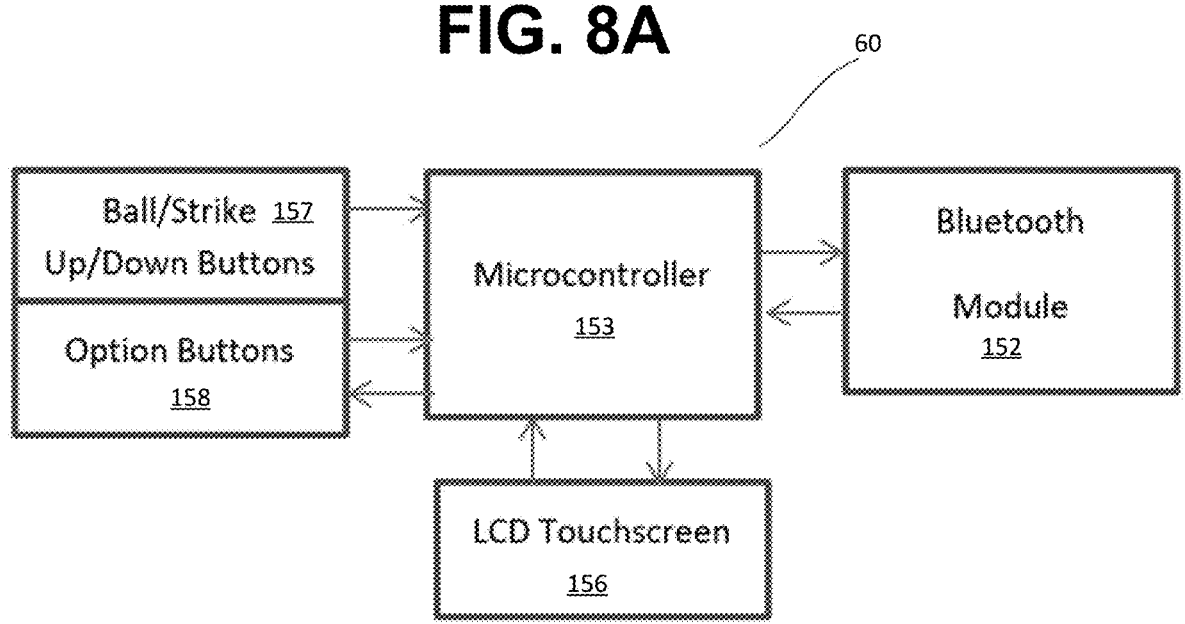
FIG. 8B is a block diagram of a handheld remote controller in accordance to embodiments.

FIG. 8B is a block diagram of handheld remote controller 60 in accordance to embodiments. Handheld remote controller 60 may be used in implementations where EHP 50 functions as a "replacement" umpire and there no longer is an umpire at home plate. The nearest umpire would then be about 100 feet away, further than the range of Wi-Fi and Bluetooth transceivers found in most smartphones.

Remote controller 60 includes a microcontroller 153, an LCD touchscreen 156, a Bluetooth module 152, a battery (not shown) and buttons 157, 158 for increasing or decreasing the ball and strike counts (manual override)

Remote controller 60 includes the following functions in embodiments:

1. Allows the user to select the height of the batter which automatically adjusts the strike zone.
2. The user can select a game/training mode. The game mode auto-increments outs and innings based on balls and strikes called by plate 50.
3. Displays current pitch and previous pitches on a ball/strike grid in front of an outline of a catcher. By pressing a button, an outline of a hitter on either side can be shown.
4. Shows the status of the plate: active, calculating, invalid image, outside pitch (outside the display area of the screen), ball, or strike.
5. Select an audible signal of a voice saying "ball", "strike", or "outside".
6. Display remaining battery life of plate 50.
7. Display pitch count.
8. Display elapsed time of session.
9. Clear screen, reset session.
10. User can override plate's call if needed.

Embodiments include a lithium-ion battery that is charged via an external port. Other embodiments include a wireless charging system. Once plate 50 is installed in a field, many facilities will not want to constantly take it in and out, and hardwiring may not be an option. Further, wireless charging also removes external ports on the device that are susceptible to dirt and water contamination.

The mechanical structure of plate 50 includes an outer urethane shell with the same hardness and tack as a regulation rubber home plate. The plastic has special dyes to prevent yellowing in the intense sun over time. The cameras look up through sapphire protective windows, which are scratch resistant. The electronics are housed in a thick aluminum or ABS plastic enclosure. The entire plate 50 can be secured in the ground with either spikes, an extra deep version, or a stanchion post mounting system.

Figure 11:
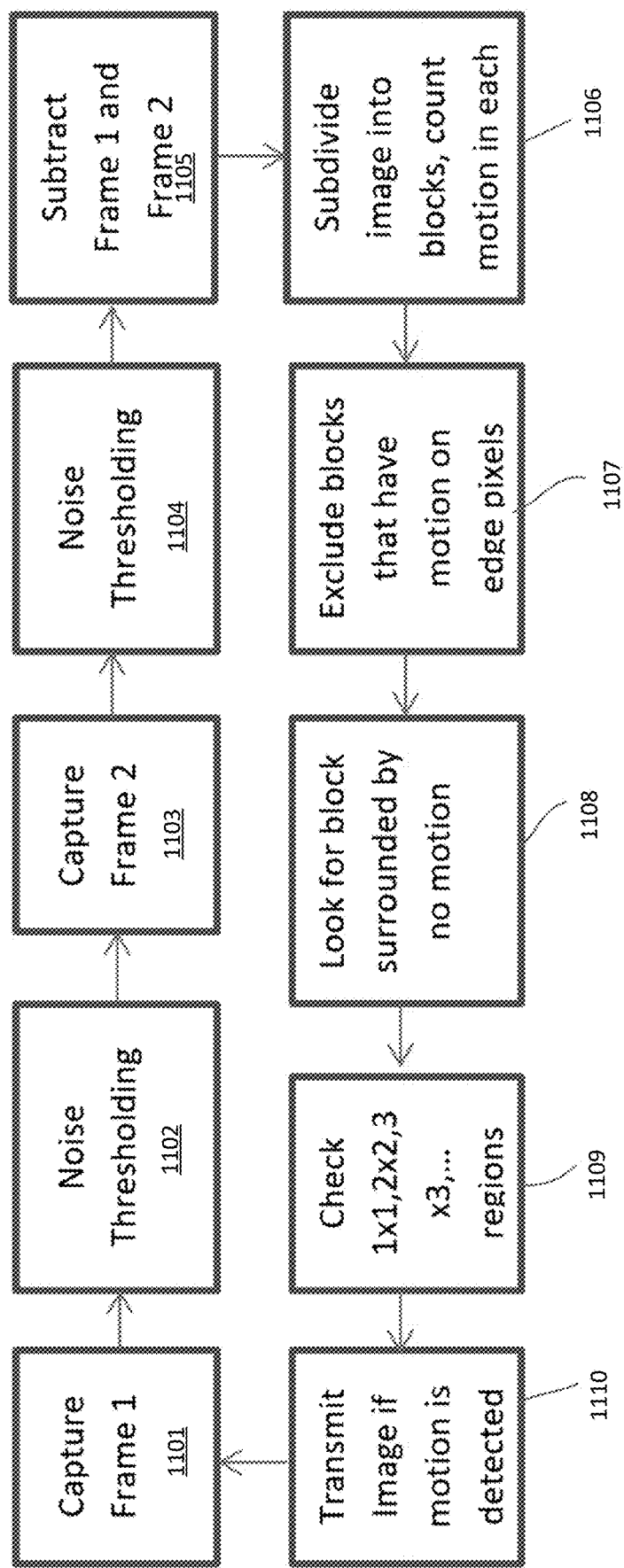
FIG. 11 is a flow diagram of the functionality of object detection in accordance to one embodiment.

FIG. 11 is a flow diagram of the functionality of object detection in accordance to one embodiment. As disclosed above, the object detection functionality disclosed in conjunction with FIG. 4 looks for a block of consecutive pixels that have all changed between two successive images. Once it finds this block, it triggers the images capture portion and leaves the determination of ball/no ball up to the secondary processing done by the functionality of FIG. 5. However, there are two situations where the functionality of FIG. 4 may fail: 1) when a hitter swings the bat well in advance of the ball crossing the plate, causing the plate to trigger and capture images where the ball is not yet present; and 2) when a hitter takes warmup swings right before a pitch is thrown. In both cases, plate 40 will process these images, but may miss the actual pitch if the cycle time is too long.

In contrast to the functionality of FIG. 4, the functionality of FIG. 11 applies a multi-level scanning window method to the image. The functionality of 1101-1105 is the same as the functionality of 150-154 of FIG. 4. At 1106, the image is subdivided into an M×N matrix of rectangles. At 1107, The motion pixels in each rectangle are counted, and if they exceed a threshold, that rectangle is given a binary assignment of 1, otherwise 0 (same as 150-154 of FIG. 4).

At 1108 and 1109, a window is scanned through all the M×N binary markers where if the core marker is 1 and all the surrounding ones are 0, this is flagged as a probable ball and the plate is triggered to take images at 1110. If no marker matches this, the plate rescans through the binary markers using 2×2, 3×3, . . . size center regions to account for low pitches appearing larger in the image. If none are found, the plate captures the next frame and tries again. Because the binary marker map is generated in real-time while the images is being read in from the image sensor, the windowing algorithm only needs a small number of clock cycles in the FPGA to complete. This takes place during the interframe gap time while the image sensor resets for the next frame acquisition. This also allows the algorithm to scale to faster frame rate cameras without ever dropping frames because of increased processing times.

The algorithm also ignores the rectangular blocks on the edges of the image since they are typically filled with undesirable motion from hitters, catchers, or bats.

Figure 12:
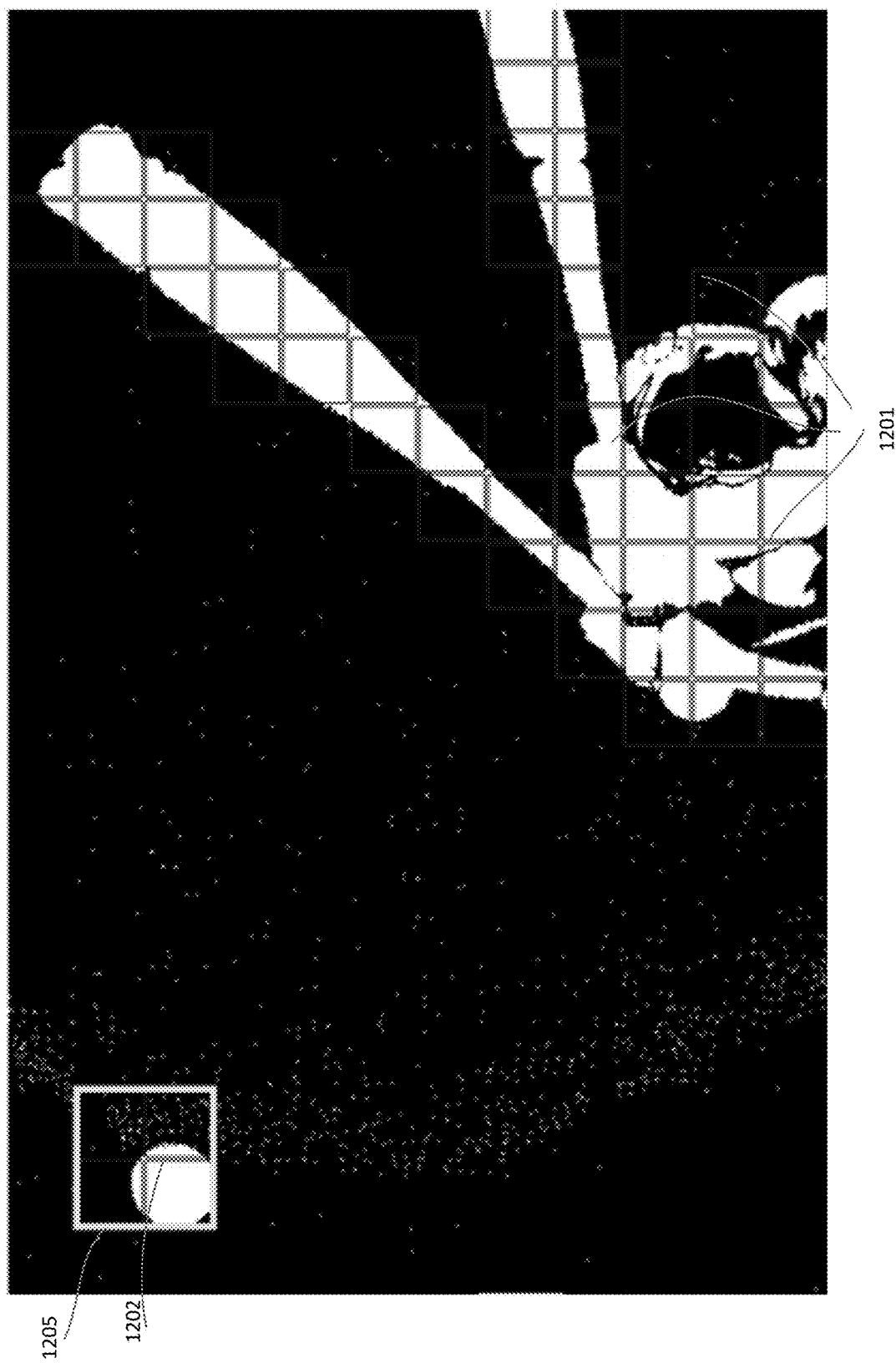
FIG. 12 illustrates an output of the functionality of FIG. 11 in accordance to embodiments.

FIG. 12 illustrates an output of the functionality of FIG. 11 in accordance to embodiments. The multiple blocks at 1201 and 1202 are where motion was detected, and block 1205 is where a 2×2 motion area was detected, surrounded by a ring of blocks with no motion. The block size can be changed to improve performance if a finer granularity is needed.

In FIG. 12, there are motion blocks detected along the bottom and right side of the image, where the batter's body and bat are. The scanning window only checks the border blocks as part of the surrounding region of a core block further in, as large areas of motion extending to the border are indicative of non-projectile motion (at 1107). FIG. 12 also shows the yellow block 1205 denoting motion, but surrounded by blocks with no motion. This is a fairly strong sign that some type of object is in flight (at 1108). But because the object in motion will be different sizes in the image depending on height, multiple size windows are scanned through the image looking for the isolated, mostly square regions (at 1109).

As disclosed, embodiments allow high frame rate processing in a small package for portability, power savings, and location flexibility, while making a determination at the frame rate of the camera as to whether an event of interest occurred, agnostic of the image sensor's frame rate, and then notifying the host processor. In embodiments, the primary components, shown for example in FIG. 8A, reside in a baseball/softball home plate with the cameras facing upwards. When a ball or bat comes into the field of view of the camera, the system will determine (e.g., as disclosed in conjunction with FIG. 4 or FIG. 11) if indeed it is a ball or bat, as opposed to, for example, a bird, cloud, arm, etc., and then send an image showing the moving part of the scene to a smartphone or other secondary device. An app on the smartphone will compare this image to either a known calibration for balls/bats or use artificial intelligence ("AI") to tell the user the position and speed of a ball, speed and location of the bat, or both. Embodiments can be used as an electronic umpire that can call balls and strikes, and also determine whether a batter checked their swing. Other embodiments can be used in other sports, such as cricket, golf, and football, and in non-sports related areas such as ballistics, optical sensor systems, and biology.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. An electronic home plate system comprising:
   a home plate enclosure;
   at least one image sensor system disposed within the enclosure, each image sensor system comprising an image sensor, a lens and a first processor;
   the first processor adapted to detect a motion of a ball by continuously capturing frames from the image sensor, the detecting motion comprising:
      capturing a first frame;
      capturing a second frame;
      subtracting the first frame from the second frame to create an image;
      checking for pixel changes between the first frame and the second frame;
      when motion is detected, transmitting the image to a second processor,
   wherein the detected motion of the ball comprises the ball passing over the home plate enclosure or the ball passing near and not over the home plate enclosure;
   the second processor adapted to characterize the detected motion in the image, the characterizing comprising:
      searching for circular blobs in a desired size range;
      checking that circular blobs in the desired size range are sufficiently filled in;
      sending a corresponding radius and XY position of each sufficiently filled in circular blob to a polynomial; and
      generating a vertical position, a lateral position, and a speed of the ball from the polynomial.

2. The system of claim 1, wherein the first processors comprises a field-programmable gate array (FPGA).

3. The system of claim 1, the first processor further adapted to check for pixel changes by checking for consecutive pixel motion in one row, and checking for consecutive motion in image rows.

4. The system of claim 1, the characterizing further comprising:
   denoising the image;
   dilating the image to fill in gaps in motion blobs; and
   undistorting the image.

5. The system of claim 4, wherein the polynomial comprises a previously fitted polynomial.

6. The system of claim 1, the first processor further adapted to check for pixel changes by subdividing the image into rectangles, count motion pixels in each rectangle and determine if the count of motion pixels in each rectangle exceed a threshold.

7. The system of claim 1, wherein the transmitted image comprises a 1-bit motion image.

8. The system of claim 1, the detecting motion further comprising applying a multi-level scanning window to the image.

9. A method of detecting a ball using an electronic home plate that comprises a home plate enclosure, and at least one image sensor system disposed within the enclosure, each image sensor system comprising an image sensor, a lens and a first processor, the method comprising:
   detecting by the first processor a motion of the ball by continuously capturing frames from the image sensor, the detecting motion comprising:
      capturing a first frame;
      capturing a second frame;
      subtracting the first frame from the second frame to create an image;
      checking for pixel changes between the first frame and the second frame;
      when motion is detected, transmitting the image to a second processor, wherein the detected motion comprises the ball passing over the home plate enclosure or the ball passing near and not over the home plate enclosure;
   the second processor characterizing the detected motion of the ball in the image, the characterizing comprising:
   searching for circular blobs in a desired size range;
   checking that circular blobs in the desired size range are sufficiently filled in;
   sending a corresponding radius and XY position of each sufficiently filled in circular blob to a polynomial; and
   generating a vertical position, a lateral position, and a speed of the ball from the polynomial.

10. The method of claim 9, wherein the first processor comprises a field-programmable gate array (FPGA).

11. The method of claim 10, the detecting motion further comprising:
    checking for pixel changes by checking for consecutive pixel motion in one row; and
    checking for consecutive motion in image rows.

12. The method of claim 10, the characterizing further comprising:
    denoising the image;
    dilating the image to fill in gaps in motion blobs; and
    undistorting the image.

13. The method of claim 12, wherein the polynomial comprises a previously fitted polynomial.

14. The method of claim 10, the detecting motion further comprising:
    checking for pixel changes by subdividing the image into rectangles;

counting motion pixels in each rectangle; and
determining if the count of motion pixels in each rectangle exceed a threshold.

15. The method of claim 10, wherein the transmitted image comprises a 1-bit motion image.

16. The method of claim 10, the detecting motion further comprising applying a multi-level scanning window to the image.

17. A non-transitory computer readable medium having instructions stored thereon that, when executed by one or more processors, detects a ball using an electronic home plate that comprises a home plate enclosure, and at least one image sensor system disposed within the enclosure, each image sensor system comprising an image sensor, a lens and a first processor, the detecting comprising:
    detecting by the first processor a motion of the ball by continuously capturing frames from the image sensor, the detecting motion comprising:
        capturing a first frame;
        capturing a second frame;
        subtracting the first frame from the second frame to create an image;
        checking for pixel changes between the first frame and the second frame;
        when motion is detected, transmitting the image to a second processor, wherein the detected motion comprises the ball passing over the home plate enclosure or the ball passing near and not over the home plate enclosure;
    the second processor characterizing the detected motion of the ball in the image, the characterizing comprising:
        searching for circular blobs in a desired size range;
        checking that circular blobs in the desired size range are sufficiently filled in;
        sending a corresponding radius and XY position of each sufficiently filled in circular blob to a polynomial; and
        generating a vertical position, a lateral position, and a speed of the ball from the polynomial.

18. The computer readable medium of claim 17, the detecting further comprising:
    checking for pixel changes by subdividing the image into rectangles;
    counting the motion pixels in each rectangle; and
    determining if the count of motion pixels in each rectangle exceed a threshold.

19. The computer readable medium of claim 17, the characterizing further comprising:
    denoising the image;
    dilating the image to fill in gaps in motion blobs; and
    undistorting the image.

20. The computer readable medium of claim 17, wherein the first processor comprises a field-programmable gate array (FPGA).

* * * * *